Jan. 5, 1965 C. A. ROYLE 3,164,371
COACH ELEVATING AND SUPPORTING STRUCTURE
Filed June 18, 1963 2 Sheets-Sheet 1

INVENTOR.
CLARENCE A. ROYLE
BY
ATTORNEYS

Jan. 5, 1965 C. A. ROYLE 3,164,371
COACH ELEVATING AND SUPPORTING STRUCTURE
Filed June 18, 1963 2 Sheets-Sheet 2
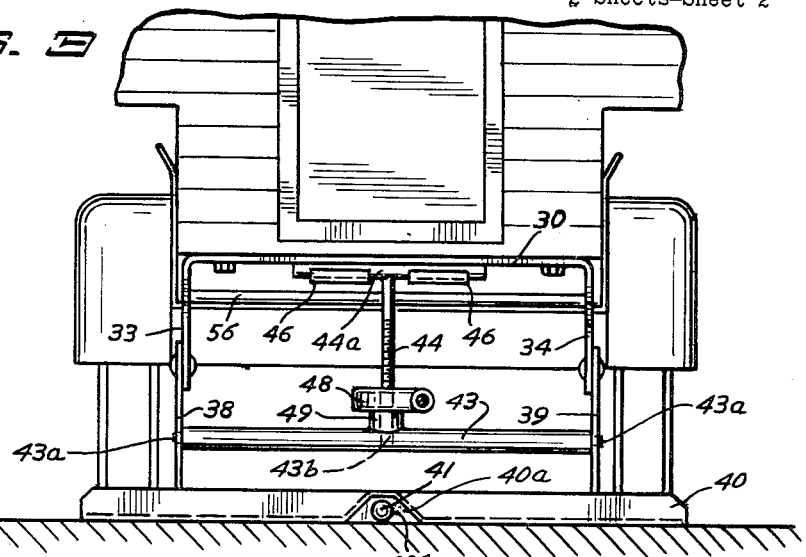
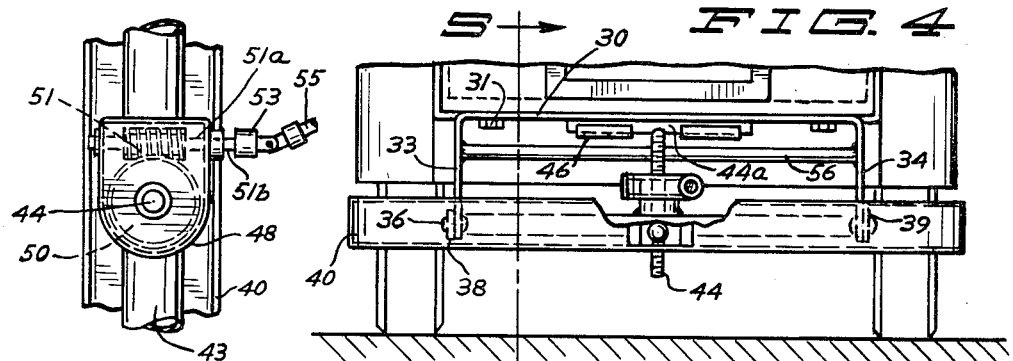
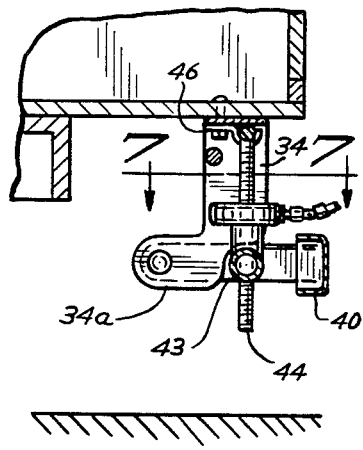
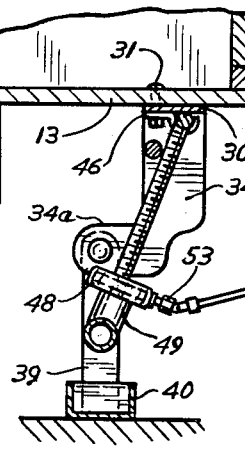
INVENTOR.
CLARENCE A. ROYLE
BY Reif and Gregory
ATTORNEYS

United States Patent Office 3,164,371
Patented Jan. 5, 1965

3,164,371
COACH ELEVATING AND SUPPORTING
STRUCTURE
Clarence A. Royle, 7949 Harriet Ave. S.,
Minneapolis, Minn.
Filed June 18, 1963, Ser. No. 288,809
2 Claims. (Cl. 254—45)

This invention relates to an elevating and supporting device to be used to support a vehicle-mounted coach type of body structure independent of the vehicle chassis. More specifically this invention relates to an elevating and supporting device for the rear end portion of a coach of a type comprising living quarters commonly referred to as a camper.

The camper type of demountable coach is a popular one in being compact and readily transportable. It is generally transported in a pickup type of vehicle, such as a truck pickup, having a deck portion which readily accommodates the coach structure. It is desirable however to have some means for readily removing the coach from the pickup when the coach is not in use. It is also desirable to have such means as may be used to remove the coach from the pickup, also serve to support the coach in a free standing position.

Applicant's device is formed as an integral part of said coach in connection with the rear end portion thereof to serve as a bumper for said coach when said coach is in a vehicle-mounted condition and serving as a supporting member for said coach when said coach is in a free standing position. Applicant's device raises and supports said coach above the level of the bed of the chassis of the vehicle conveying said coach whereby when said coach is elevated to a raised free standing position the vehicle may be driven away from or backed under said coach to receive the same thereon. A front end support is shown only incidentally in connection with a coach but not as a part of the applicant's invention. The applicant's invention set forth herein relates particularly to a support for the rear end portion of the coach.

It is an object of this invention to provide a novel rear end support for a demountable vehicle conveyed coach.

It is a further object of this invention to provide a supporting device for a camper type of coach, said device being integral with said coach forming a bumper therefor when in raised position with said coach mounted on the chassis of a vehicle and forming a ground-engaging support when said camper is demounted holding said coach at its rear end portion at an elevation above the floor level of the chassis of its conveying vehicle.

It is a more specific object of this invention to provide a device of the type above indicated having integral therewith means for a simple and efficient manual operation of the same to raise a coach structure free from a supporting vehicle or lower the same to rest on a vehicle as may be desired.

These and other objects and advantages of the invention will be fully set forth in the following description made in connection with the accompanying drawings in which like reference characters refer to similar parts throughout the several views and in which:

FIG. 3 is a broken view in vertical section taken on line 3—3 of FIG. 2 as indicated by the arrows;

FIG. 4 is a view similar to that in FIG. 3 showing applicant's device in an alternate position;

FIG. 5 is a fragmentary view in vertical cross section taken on line 5—5 of FIG. 4 as indicated;

FIG. 6 is a view similar to that in FIG. 5 showing applicant's device in an alternate position; and FIG. 7 is a fragmentary view in horizontal section taken on line 7—7 of FIG. 5 as indicated by the arrows.

Figure 1:
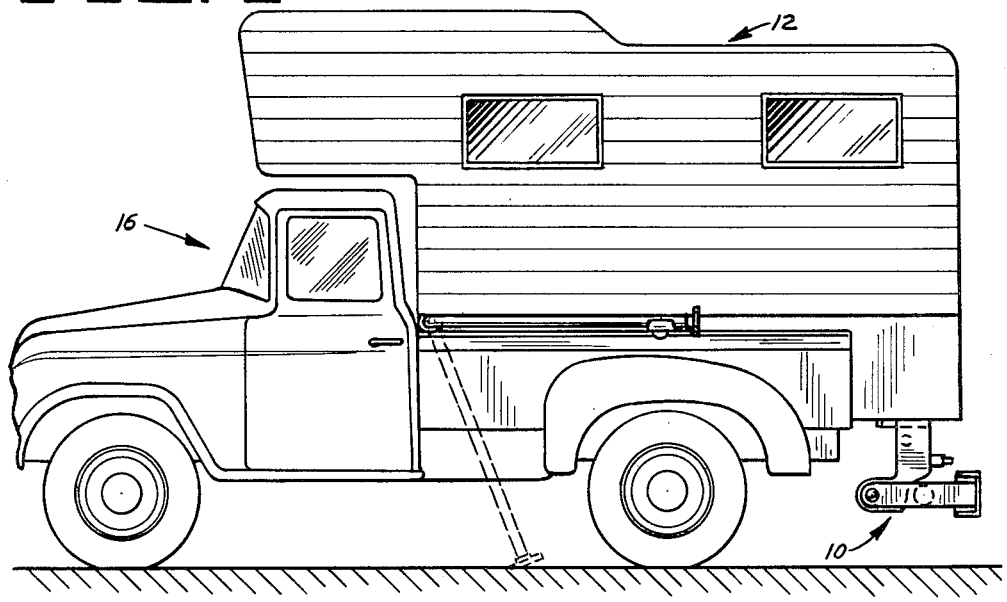
FIG. 1 is a view in side elevation showing applicant's device in one position with some portions shown in dotted line.
Figure 2:
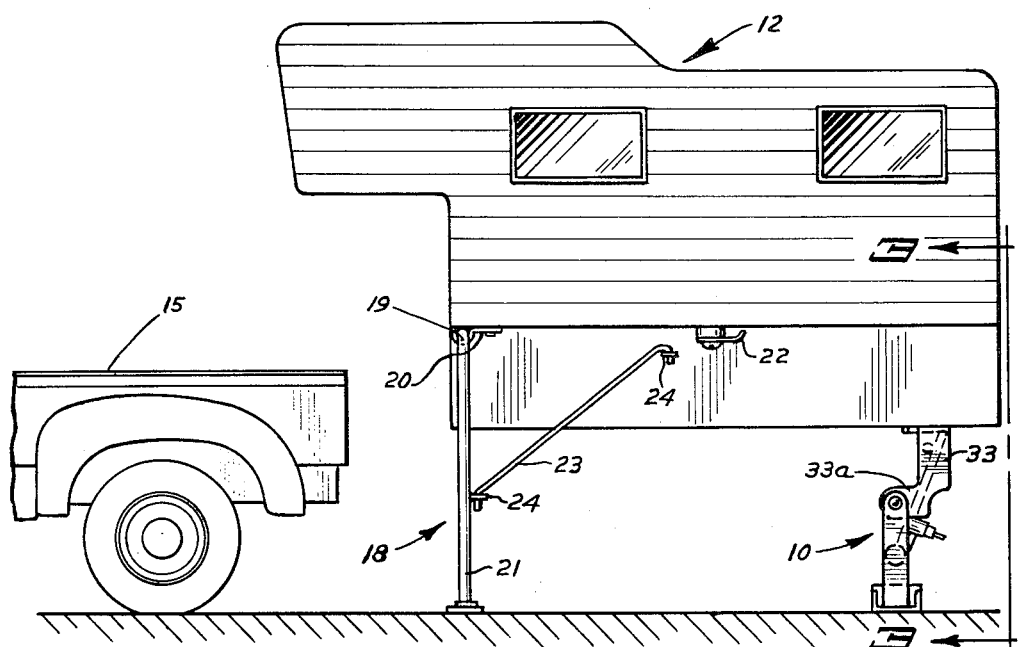
FIG. 2 is a view similar to that in FIG. 1 with applicant's device shown in another position and with portions thereof being shown in dotted line.

With reference to FIGS. 1 and 2, applicant's device 10 is shown in operating position carried by a demountable vehicle mounted coach type of a camping structure 12 on the order of the known camper type of structure and referred to hereinafter as a coach. Said coach is mounted on the deck portion 15 of a pickup truck type of motor vehicle 16.

Said coach is provided with a forward supporting structure extending transversely thereunder comprising a U-shaped tubular member 18 having a central body portion 19 pivotally supported by brackets 20 secured to the under side of said coach at either side thereof with said body portion having leg portions 21 extending from either end thereof at either side of said coach though only the near side leg is shown in the drawings. A clip 22 mounted at either side of said coach will support said legs in raised position. A link member 23 having angled end portions respectively disposed in eyelet brackets 24 on said leg portions 20 and at either side of said coach forms a brace for said legs in standing position. This forward supporting structure does not form part of the applicant's invention herein but is merely incidental thereto in showing by example a forward support for the coach.

More specifically with reference to applicant's elevating and supporting device 10, this structure may take various forms within applicant's inventive scope. In a preferred embodiment, this device is shown comprising a substantial flat metal plate member 30 secured by bolts 31 to the rear end underside portion 13 of said coach. Depending from either end of said plate member 30 and integral therewith as by welding or unitarily formed therewith are arm portions 33 and 34 plate-like in form having forwardly extending lower end portions 33a and 34a. Said arms form links in applicant's device.

Pivoted to said links 33 and 34 as by rivet type of pivots 36 are links 38 and 39 indicated as being substantially rectangular and plate-like in form.

Carried at the free ends of said links 38 and 39 and secured thereto as by welding is a channel member 40 forming a bumper. With reference to FIGS. 4 and 5, the central longitudinal portion of said bumper is deformed to provide an angular pocket 40a having a unitary underlying plate 40b supporting a ball type of trailer hitch 41. The links 33-38 and 34-39 will be of such length that when straightened out they will raise the coach free from engagement with the deck of said vehicle 16.

Extending between said links 38 and 39 spaced above said bumper 40 is a tubular frame member 43 having stub projections 43a of reduced diameter at either end thereof respectively journaled in said links 38 and 39 which are respectively apertured to provide suitable bearings. Depending from said plate member 30 is a screw rod 44 integral at its upper end with a rod-like cross member 44a which is pivotally held adjacent said plate member by transversely spaced brackets 46 having curved forward portions to receive said cross member and plate-like portions secured to said plate member 30 as by welding, as indicated in FIGS. 5 and 6.

Carried centrally of said tubular member 43 and welded thereto is a gear housing 48 having an underlying collar-like portion 49 seated on said tubular member 43. Said housing 48 is suitably shaped to have journaled therein a relatively flat cylindrical worm gear 50 and also journaled in said housing in engagement with said worm gear is a worm wheel 51 having a suitable ratio to said worm gear and having a shaft portion 51a thereof extending outwardly of said housing with said housing being suitably apertured to form bearings for said shaft. Said shaft at one end 51b will be formed to be removably received within a socket 53 pivotally connected to a crank 55. This type of structure is known in the art. Said gear 50 will be axially tapped to receive said screw rod 44 and said gear will travel on said rod. Said tubular member 43 has an aperture 43b therethrough to accommodate the axial movement of said screw rod 44.

Extending between the upper portions of said links 33 and 34 and welded thereto is a bracing rod 56.

Although not here shown and forming no part of the invention herein, suitable means will be provided to link the device 10 as to the bumper or chassis of the pickup 16 to anchor the coach 12 thereto in the event a vehicle is hitched to said coach.

Operation

With the coach 12 in mounted position, applicant's device 10 is in retracted position, as indicated in FIGS. 1, 4 and 5, and in such position serves as a bumper. The coach has sufficient weight to ride well on the vehicle.

When it is desired to remove said coach from the vehicle, with applicant's device this may be accomplished by one person. The front supporting structure 18 is released from the clips 22 and the leg portions are dropped to engage the ground in an inclined position.

Next the crank 55 will be connected to the shaft 51b of the worm wheel 51. The crank will be rotated to cause the worm gear 50 to travel downwardly of the screw rod 44 and thus lower the bumper 40 to a ground engaging position. When the bumper first engages the ground, the links 38 and 39 will be inclined relative to the plane of the ground. As the worm gear 50 is moved further along said screw rod 44, the links 38 and 39 will assume positions at right angles to the plane of the ground and in so doing the coach is raised free of engagement with the deck of the vehicle. This action in raising the coach also draws it rearwardly with the point at which the bumper first engages the ground becoming a fulcrum point. This action in drawing the coach upwardly and rearwardly also straightens out the forward supporting legs whereby said coach becomes free standing and is free of engagement with the deck of the vehicle. The vehicle then is merely driven away from under the coach. The links 23 will stabilize the legs 21.

Thus it is seen that applicant's device very conveniently and efficiently provides an elevating and supporting structure for a demountable coach type of structure. Applicant's device has proved to be very satisfactory in use.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

1. An elevating and supporting structure for a demountable vehicle supported body having in combination,
   a pair of links depending from the rear end portion of said body spaced transversely thereof,
   a pair of links respectively pivoted to said last mentioned links and depending therefrom,
   said pairs of pivoted links respectively having a combined length greater than the height of the supporting surface of said vehicle,
   a ground-engaging elongated plate member carried at the free ends of said last mentioned links,
   a tubular member extending between said last mentioned links spaced inwardly of said plate member,
   a screw rod pivotally depending from the rear end portion of said body,
   said tubular member being apertured to receive the free end portion of said screw rod,
   a gear housing carried by said tubular member,
   a worm gear carried in said housing, said worm gear being axially tapped to have said screw rod threaded therethrough whereby said worm gear will travel on said screw rod,
   a worm wheel journaled in said housing engaging said worm gear, and
   a crank removably engaging said worm wheel to rotate the same.

2. An elevating and supporting structure for a demountable vehicle supported body having in combination,
   pairs of pivotally connected links spaced transversely of said body and depending from the rear end portion thereof,
   said pairs of links respectively having an effective length greater than the height of the supporting surface of said vehicle,
   a ground-engaging plate member carried at the free ends of said links,
   a screw rod pivotally depending from said body between said pairs of links,
   means traveling on said screw rod,
   means anchoring said last mentioned means to said pairs of links adjacent said plate member, and
   means actuating said traveling means to move axially of said screw rod and raise or lower said plate member.

References Cited by the Examiner

UNITED STATES PATENTS 1,354,175  9/20  De Mattia _____ 254—86
2,146,955  2/39  Helms et al.

WILLIAM FELDMAN, *Primary Examiner.*

MILTON S. MEHR, *Examiner.*